(12) United States Patent
Deane et al.

(10) Patent No.: US 6,830,382 B1
(45) Date of Patent: Dec. 14, 2004

(54) MINIATURE FORM-FACTOR CONNECTER FOR FIBER OPTIC MODULES

(75) Inventors: Peter Deane, Los Altos, CA (US); Luu T. Nguyen, Sunnyvale, CA (US); William P. Mazotti, San Martin, CA (US); Bruce C. Roberts, San Jose, CA (US); Christopher J. Smith, Swaffham Prior (GB); Janet E. Townsend, Fulbourn (GB); John P. Briant, Cambridge (GB); Michael R. Nelson, Barhill (GB); Stephen Jacob, Huntingdon (GB)

(73) Assignee: National Semiconductor Corporation, Santa Clara, CA (US)

( * ) Notice: Subject to any disclaimer, the term of this patent is extended or adjusted under 35 U.S.C. 154(b) by 125 days.

(21) Appl. No.: 10/194,586

(22) Filed: Jul. 12, 2002

Related U.S. Application Data

(60) Provisional application No. 60/342,305, filed on Dec. 20, 2001.

(51) Int. Cl.$^7$ .................................................. G02B 6/26
(52) U.S. Cl. ............................... 385/88; 385/89; 385/90
(58) Field of Search ........................ 385/60–65, 81–83, 385/52–56, 88–92, 136, 59, 77–78

(56) References Cited

U.S. PATENT DOCUMENTS

| | | | | |
|---|---|---|---|---|
| 5,325,455 A | * | 6/1994 | Henson et al. ................. | 385/89 |
| 5,452,390 A | * | 9/1995 | Bechtel et al. ................. | 385/92 |
| 5,896,479 A | * | 4/1999 | Vladic .......................... | 385/59 |
| 5,933,558 A | * | 8/1999 | Sauvageau et al. ........... | 385/88 |
| 6,086,263 A | * | 7/2000 | Selli et al. .................... | 385/88 |
| 6,149,313 A | * | 11/2000 | Giebel et al. ................. | 385/59 |
| 6,239,427 B1 | * | 5/2001 | Mizue ......................... | 250/239 |
| 6,318,909 B1 | * | 11/2001 | Giboney et al. .............. | 385/90 |
| 6,356,686 B1 | * | 3/2002 | Kuczynski ................... | 385/39 |
| 6,459,843 B1 | * | 10/2002 | Igl et al. ...................... | 385/136 |
| 6,513,989 B1 | * | 2/2003 | Bleck et al. .................. | 385/60 |
| 6,601,996 B1 | * | 8/2003 | Rosson et al. ................ | 385/78 |
| 6,634,796 B2 | * | 10/2003 | de Jong et al. ............... | 385/56 |
| 6,659,658 B2 | * | 12/2003 | Asada et al. .................. | 385/92 |

OTHER PUBLICATIONS

U.S. Prov. Pat. App. No. 60/342,305 filed Dec. 20, 2001.
U.S. Pat. App. No. 09/568,094 filed May 9, 2000 (now U.S. Pat. No. 6,364,542).
U.S. Pat. App. No. 09/568,558 filed May 9, 2000.
U.S. Pat. App. No. 09/713,367 filed Nov. 14, 2000 (now U.S. Pat. No. 6,497,518).

(List continued on next page.)

Primary Examiner—Joseph Williams
Assistant Examiner—Dalei Dong
(74) Attorney, Agent, or Firm—Beyer Weaver & Thomas LLP

(57) ABSTRACT

An embodiment includes a connector element that comprises a connector body and a fiber optic ferrule slidably positioned inside the connector body. The ferrule holds at least one optical fiber. The connector element carries an optical sub-assembly including a photonic device and a spacer and includes a connector sleeve for receiving the connector element. The sleeve includes a ridge that operates as a first stop for the connector body and includes an alignment projection that coarsely aligns the fiber optic ferrule. The ferrule includes a pair of openings configured to receive a pair of alignment pins to provide fine alignment of optical fibers with corresponding photonic devices. The connector element is engaged with the connector sleeve to position the ferrule with respect to the optical sub-assembly such that the optical fiber is correctly positioned relative to a corresponding photonic device. Also, the invention teaches a method of using the described apparatus to position optical fibers relative to corresponding photonic devices of an optical sub-assembly.

19 Claims, 12 Drawing Sheets

OTHER PUBLICATIONS

U.S. Pat. App. No. 09/922,358 filed Aug. 3, 2001.
U.S. Pat. App. No. 09/922,598 filed Aug. 3, 2001.
U.S. Pat. App. No. 09/922,357 filed Aug. 3, 2001.
U.S. Pat. App. No. 09/922,601 filed Aug. 3, 2001.
U.S. Pat. App. No. 09/990,475 filed Nov. 20, 2001 (covered to U.S. Prov. Pat. App. No. 60/331,338 with file date Nov. 20, 2001.
U.S. Pat. App. No. 09/963,039 filed Sep. 24, 2001.

* cited by examiner

MINIATURE FORM-FACTOR CONNECTER FOR FIBER OPTIC MODULES

CROSS-REFERENCE TO RELATED APPLICATIONS

This application claims priority of U.S. provisional patent application No. 60/342,305, filed Dec. 20, 2001, entitled "Miniature Form-Factor Connector for Fiber Optic Modules", which is hereby incorporated by reference.

This application is related to the following U.S. Patent documents:

U.S. patent application Ser. No. 09/568,094, entitled "Device And Method For Providing A True Semiconductor Die To External Fiber Optic Cable Connection," by Deane et al., filed on May 9, 2000;

U.S. patent application Ser. No. 09/568,558, entitled "Arrayable, Scalable And Stackable Molded Package Configuration," by Nguyen et al., filed on May 9, 2000;

U.S. patent application Ser. No. 09/713,367, entitled "Miniature Opto-Electric Transceiver," by Peter Deane, filed on Nov. 14, 2000;

U.S. patent application Ser. No. 09/922,358, entitled "Miniature Semiconductor Package For Opto-Electronic Devices," by Nguyen et al., filed on Aug. 3, 2001;

U.S. patent application Ser. No. 09/922,598, entitled "Techniques For Joining An Opto-Electronic Module To A Semiconductor Package," by Nguyen et al., filed on Aug. 3, 2001;

U.S. patent application Ser. No. 09/922,357, entitled "Optoelectronic Package With Dam Structure To Provide Fiber Standoff", by Nguyen et al., filed on Aug. 3, 2001;

U.S. patent application Ser. No. 09/922,601, entitled "Optical Sub-Assembly For Opto-Electronic Modules," by Mazotti et al., filed on Aug. 3, 2001;

U.S. patent application 60/331,338, entitled "Ceramic Optical Sub-Assembly For Opto-Electronic Modules", by Liu et al., filed on Nov. 20, 2001; and to U.S. patent application Ser. No. 09/963,039, "Techniques For Attaching Rotated Photonic Devices To An Optical Sub-Assembly In An Optoelectronic Package", by Nguyen et al., filed on Sep. 24, 2001, the content of each of which are hereby incorporated by reference.

FIELD OF THE INVENTION

The invention described herein relates generally to electro-optical connectors. In particular, it relates to connectors that can facilitate the connection of optical fibers with electronic systems.

BACKGROUND OF THE INVENTION

Due to increasing needs for bandwidth, modem computer and communication networks are placing increasing reliance on optical signal transmission through fiber optic cabling. With fiber optic cabling, data is transmitted using light signals, not electrical signals. For example, a logical "1" may be represented by a light pulse of a specific duration and a logical "0" may be represented by the absence of a light pulse for the same duration. In addition, it is also possible to transmit at the same time multiple colors of light over a single strand of optic fiber, with each color of light representing a distinct data stream.

Fiber optic cabling is very efficient for transferring data as light signals. However, current technologies are not as efficient in using such light signals in processing data. Therefore, data is typically transferred and stored in various locations before, during and after it is operated on in a computer. There is still no efficient way to "store" light signals representative of data. Networks will therefore likely continue using fiber optics for transmitting data between nodes and silicon chips to process the data within the nodes for the foreseeable future. The interface between the fiber optic cable and the nodes that process the data is therefore problematic because signals need to be converted between the electrical and the light domains.

Fiber optic transceivers, which convert light signals from a fiber optic cable into electrical signals, and vice versa, are used as the interface between a fiber optic line and a computer node. A typical transceiver includes a substrate and one or more electro-optic semiconductor devices mounted on the substrate. These electro-optic semiconductor devices can include optical detectors for converting light signals received over the fiber optic cables into electrical signals and/or optical emitters for converting electrical signals from the semiconductor devices into light signals. A number of fiber optic transceivers are commercially available from a variety of sources including Hewlett Packard, AMP, Sumitomo, Nortel, and Siemens. Some of the drawbacks of existing fiber optic transceivers are that they are generally relatively expensive and relatively difficult to fabricate and in some cases do not permit easy interconnection between optical fiber and a corresponding device. Accordingly, there are continuing efforts to provide improved electro-optic connectors.

SUMMARY OF THE INVENTION

To achieve the foregoing and other objects of the invention, a variety of arrangements for positioning at least one optical fiber relative to a photonic device are described. In one aspect of the invention, a connector sleeve is provided that is suitable for receiving a ferrule that holds at least one optical fiber. The connector sleeve is arranged to carry an optical sub-assembly having at least one photonic device. The connector sleeve includes a ridge that operates as a first stop for a connector body into which the fiber optic ferrule is slidably positioned. Also, the connector sleeve includes a longitudinally extending alignment projection that laterally aligns the fiber optic ferrule with respect to the photonic devices of the optical sub-assembly to ensure engagement of alignment pins of the optical sub-assembly with alignment openings in the ferrule.

In another aspect of the invention, a connector having a connector body and a fiber optic ferrule that holds at least one optical fiber is provided. The ferrule is slidably positioned in the connector body. The optical sub-assembly includes a spacer that constrains longitudinal movement of the fiber optic ferrule so that each optical fiber attains a desired standoff with respect to a corresponding photonic device. Another connector embodiment includes a slot and tab arrangement to provide lateral stability in the ferrule.

Another apparatus embodiment includes a connector element having a connector body and a fiber optic ferrule that holds optical fibers, the ferrule slidably positioned inside the connector body. The connector element also includes a connector sleeve configured to receive the connector element and arranged to carry an optical sub-assembly including photonic devices. The sleeve includes a ridge that operates as a first stop for the connector body and includes a longitudinally extending alignment projection that coarsely aligns the fiber optic ferrule laterally with respect to the photonic devices of the optical sub-assembly. The connector element is engaged with the connector sleeve to position the ferrule with respect to the optical sub-assembly such that the optical fiber is correctly positioned relative to a corresponding photonic device.

Aspects of the invention also include a method embodiment for positioning an optical fiber held by a ferrule that is slidably mounted within a connector body, relative to a corresponding photonic device of an optical subassembly carried by a connector sleeve. The method comprises urging the fiber optic ferrule toward the corresponding photonic device of the connector sleeve, coarsely aligning the optical fiber of the ferrule with the corresponding photonic device of the connector sleeve as the fiber optic ferrule is urged toward the connector sleeve, and finely aligning the optical fiber of the fiber optic ferrule with the corresponding photonic device of the connector sleeve as the ferrule is urged toward the corresponding photonic device until the optical fiber is correctly positioned with respect to the corresponding photonic device.

BRIEF DESCRIPTION OF THE DRAWINGS

The following detailed description will be more readily understood in conjunction with the accompanying drawings, in which.

It is to be understood that, in the drawings, like reference numerals designate like structural elements. Also, it is understood that the depictions in the figures are not necessarily to scale.

DETAILED DESCRIPTION OF THE DRAWINGS

The present invention is described with reference to a few embodiments, as illustrated in the accompanying drawings.

In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to a miniature form-factor connector for fiber optic modules. Such connectors are used to connect optical fibers to photonic devices. In the depicted embodiments, the photonic devices are connected to electronic systems. As used herein, photonic devices refer to optical receivers or optical emitters (e.g., laser diodes). In some embodiments, such connectors facilitate the connection of a plurality of optical fibers to a plurality of photonic devices. Commonly, the photonic devices form part of an optical sub-assembly (OSA). The OSA is an interface device for translating high-speed electrical data signals into optical data signals (and/or vice versa). In one embodiment, an optical sub-assembly has a supporting wall with photonic devices formed thereon. The optical sub-assembly is coupled to a semiconductor chip using a semiconductor chip sub-assembly (CSA), and in this way electrical signals can be converted to optical signals and vice versa. The OSA can be used to form optical-electrical modules for transceiver, transmitter, and receiver applications. Such applications include, but are not limited to, chip-to-chip, board-to-board, chassis-to-chassis, and system-to-system inter-networking.

Figure 1:
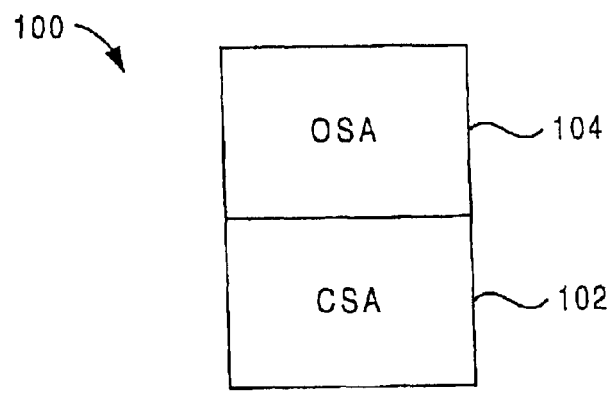
FIG. 1 is a simplified block diagram of an electro-optical module (EOM) in accordance with one embodiment of the present invention.

FIG. 1 is a block diagram describing the structural overview of a typical electro-optic module (EOM) 100 in accordance with the present invention. The EOM 100 is composed of a semiconductor chip sub-assembly (CSA) 102 that is electrically connected to an optical sub-assembly (OSA) 104. The CSA 102 and the OSA 104 operate together to translate optical signals to electrical signals and vice-versa. Depending on the nature of the photonic devices mounted thereon, the OSA 104 can receive and transmit optical signals from and to optical fibers that are connected to the OSA 104. Examples of suitable EOM's are described in the U.S. patent applications incorporated hereinabove, including, but not limited to U.S. patent application Ser. No. 09/922,601, entitled "Optical Sub-Assembly for Opto-Electronic Modules," filed on Aug. 3, 2001 and U.S. patent application 60/331,338, entitled "Ceramic Optical Sub-Assembly for Opto-Electronic Modules", filed on Nov. 20, 2001. Other EOM embodiments can also be used.

Figure 2:
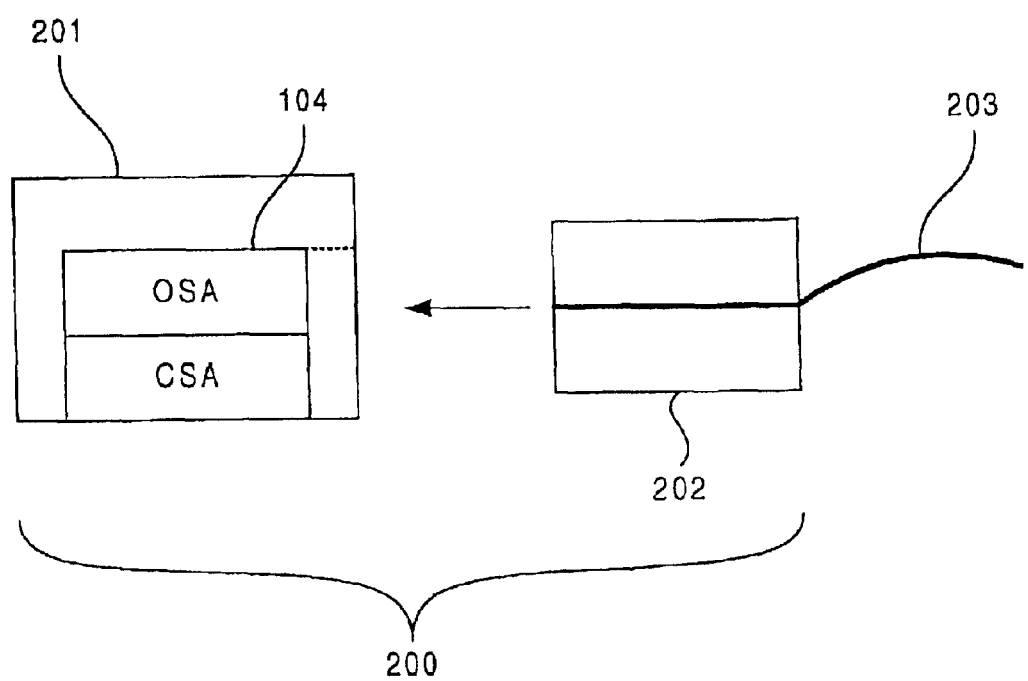
FIG. 2 is a simplified block diagram of a connector element and connector sleeve used for interconnecting an electro-optical module, such as that shown in of FIG. 1, with optical fibers in accordance with some embodiments of the present invention.

As shown in the block diagram of FIG. 2, in one embodiment, the CSA 102 and OSA 104 are fitted to a portion of a fiber optic connector apparatus 200. The fiber optic connector apparatus 200 depicted here is shown comprising two major components 201, 202 for interconnecting optical fibers to the photonic devices of the OSA 104. One component is a connector sleeve 201 onto which the CSA 102 and OSA 104 are fitted. The other component is a connector element 202 that holds the optical fibers 203. The purpose of the fiber optic connector apparatus 200 is to optically connect the optical fibers 203 with the OSA 104. When the connector element 202 is connected to the connector sleeve 201, the optical fibers 203 are optically interconnected with the photonic devices of the OSA 104. The fiber optic connector apparatus 200 is constructed such that when the connector element 202 is connected to the connector sleeve 201, the optical fibers 203 are aligned and positioned with respect to the photonic devices of the OSA 104. This connector apparatus 200 optically connects a plurality of optical fibers to the photonic devices of the OSA 104. In one embodiment, this connector element 202 secures a ribbon of multiple optical fibers, which are then appropriately positioned with respect to the photonic devices of the OSA 104.

Figure 3:
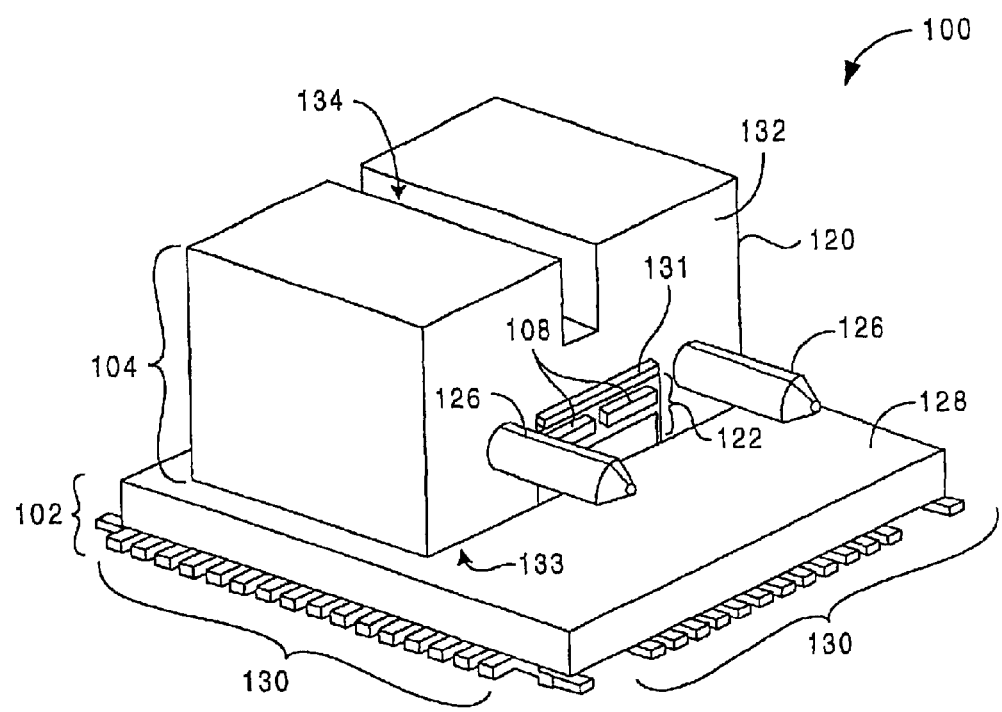
FIG. 3 is a perspective view of a simplified embodiment of an optical sub-assembly constructed in accordance with the principles of the present invention.

FIG. 3 depicts a perspective view of a simplified embodiment of an EOM 100 of the present invention. The depicted CSA 102 can be formed of a variety of semiconductor chip packages that have electrical connection pathways for connection to optical sub-assemblies. For instance, the CSA 102 can be a leadless leadframe package (LLP) that has up-linking contact surfaces that are exposed through the top surface of the LLP. The OSA 104 includes photonic devices 108. The photonic devices 108 can be either optical emitters (e.g., lasers) or detectors. The photonic devices 108 can include a single laser or detector or multiple arrays of such emitters and/or detectors. In an embodiment of the present invention, the photonic devices 108 are arrays of vertical cavity surface emitting lasers (VCSEL's). The details of a suitable CSA formed from an LLP are disclosed in U.S. patent application Ser. No. 09/922,357, entitled "Optoelectronic Package with Dam Structure to Provide Fiber Standoff" which is hereby incorporated by reference.

The depicted EOM 100 includes a CSA 102 and an OSA 104. In one embodiment, the OSA 104 includes a block 120 having photonic devices 108 formed on a block face. The block 120 also includes a spacer 131 positioned and sized to define a standoff distance between the photonic devices 108 and their associated optical fibers. The OSA 104 also includes alignment pins 126 extending from the block face, the pins 126 being used to align the photonic devices 108 relative to a ferrule that holds optical fibers. Electrical connections are made between the photonic devices 108 and the CSA 102. In one embodiment, the connections are made by electrical contacts formed on a flexible circuitry tape 122 mounted on the block 120. The depicted CSA 102 is, for example, an LLP with a molded plastic package 128 and contact leads 130 that protrude from the bottom surface. It should be noted that other methods of establishing electrical contact between the CSA 102 and the photonic devices 108 can be used. For example, etched metal leads can be used.

Referring again to FIG. 3, the block 120 includes a front surface 132 that has photonic devices 108 and fine alignment pins 126 located thereon. The pins 126 extend in a direction normal to the front surface 132 of the block 120. These pins 126 facilitate fine positioning of the photonic devices 108 with respect to optical fibers to be connected to the OSA 104. The block 120 can be formed of a variety of materials including, but not limited to, polyethylene ether ketone (PEEK), liquid crystal polymer (LCP), polyphenylene sulfide (PPS) or ceramic (e.g., $Al_2O_3$). Also, the pins 126 can be made of any sufficiently rigid material including, but not limited to, steel or stainless steel pins. The block 120 includes a bottom surface, which is used to position the block 120 on the underlying chip (CSA) 102. The block 120 is structured to provide electrical contact between the chip 102 and the photonic devices 108. In one embodiment, this is facilitated using a flexible circuitry tape 122 to provide electrical connections between the chip 102 and the photonic devices 108.

It is to be noted that FIG. 3 describes but one possible EOM embodiment 100. The depicted photonic devices 108 can comprise arrays of photonic devices (including arrays of optical detectors and arrays of optical emitters). Such combinations of laser emitters and detectors facilitate the use of the opto-electronic module 100 as an optical transceiver. In one example, a 4-channel transceiver may be formed using one 1×4 laser emitter array and one 1×4 detector array. However, in alternative embodiments, if only one array of laser emitters is connected to the OSA 104, the module 100 functions as a transmitter. Likewise, in another alternative embodiment, only one array of detectors is connected to the OSA 104, thereby making the module 100 a receiver. Also alternatively, the OSA 104 can be constructed using only one type of photonic device (e.g., all lasers, all detectors, etc.). Also, embodiments of the invention can be constructed using two-dimensional photonic device arrays comprising M×N photonic devices. Such arrays can be connected to, for example, an M×N array of optical fibers. So the possible combinations of devices are endless. Thus, the inventors contemplate the implementation of a wide variety of photonic devices and device configurations. Additionally, the inventors contemplate that some embodiments will include the placement of optical elements between the photonic devices and corresponding optical fibers. Such optical elements include, but are not limited to, lenses and optical filters of arrays of such elements.

With continued reference to FIG. 3, the spacer 131 is depicted on the front surface 132 of the block 120. This spacer 131 acts as an optical stop for a ferrule holding optical fibers. The spacer defines a "standoff" distance between a photonic device 108 and its associated optical fiber. Thus, the spacer 131 is formed to a high degree of precision and defines a correct optical distance between the photonic devices 108 and their associated optical fibers. The spacer 131 also serves to protect the photonic devices 108 from direct contact with the ferrule.

Figure 4A:
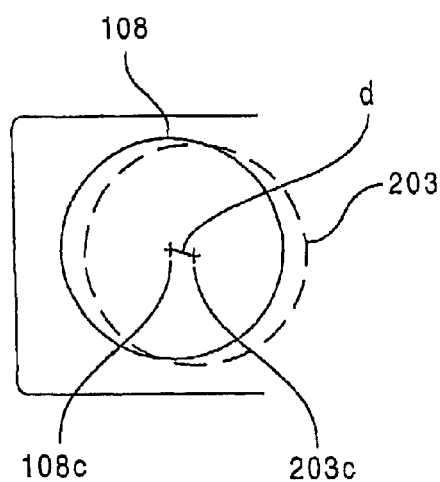
FIGS. 4(a) and 4(b) are various views of the alignment of optical fiber and photonic devices.

Alignment between the optical fibers and the photonic devices is one very important consideration in designing connector apparatus for interfacing optical fibers with photonic devices of the OSA. FIG. 4(a) depicts a face-on view of a photonic device 108. The center 108c of the facing surface (or facet) of the photonic device is also shown. Superimposed over the photonic device 108 is the outline of an optic fiber 203 that corresponds to the photonic device 108. The center 203c of the facing surface (or facet) of the optic fiber 203 is also shown. The distance "d" between the two centers 108c and 203c defines an aspect of alignment. In one embodiment, it is desirable to position the center of the facet of the optical fiber 203c within about 5 $\mu m$ (micrometer) from the center 108c of the facet of the corresponding photonic device 108. In other embodiments, the centers (203c, 108c) can be positioned at other distances (e.g., 25 $\mu m$, 15 $\mu m$, 10 $\mu m$, 1 $\mu m$, or whatever distance is required by the particular combination of optical components).

Figure 4B:
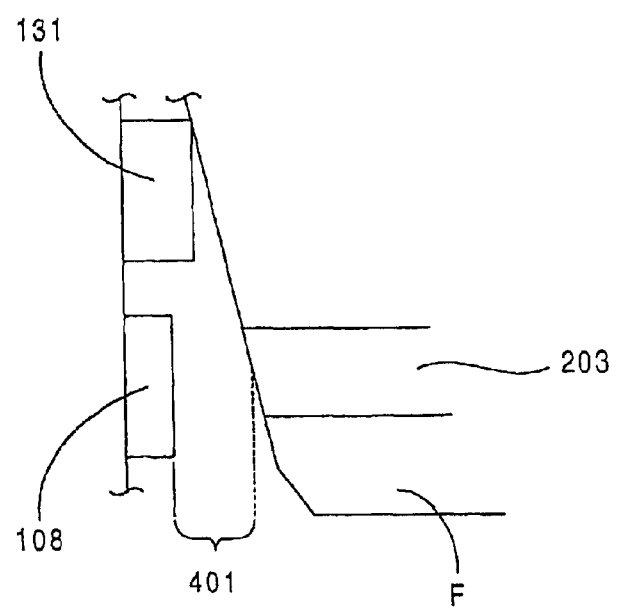

FIG. 4(b) depicts another aspect of alignment between the optical fibers and the photonic devices. FIG. 4(b) is a side view of an interface between an optical fiber 203 and a photonic device 108. The fiber 203 is held by a ferrule F. The ferrule F contacts the spacer 131 as a connector is joined. The spacer 131 is positioned and sized such that when it is in contact with the facing surface of the ferrule F, the distance 401 between the facing surface of the photonic device 108 and the facing surface of the optic fiber 203 is optically correct. Thus the interface between the ferrule F and the spacer 131 defines an optical stop. This is important because an optical fiber 203 positioned either too far or too close to the photonic device 108 suffers from sub-optimal performance in the optical connection between the optical fiber 203 and the corresponding photonic device 108. In one embodiment, it is desirable to position the facing surface of the optical fiber 203 within about 40–75 $\mu m$ (micrometer) from the facing surface of the corresponding photonic device 108. However, such distances vary depending on the fibers and photonic devices used. The foregoing positioning and alignment issues are magnified in embodiments where a plurality of optical fibers is optically connected with arrays of photonic devices. As is shown in Fib. 4(b), the spacer 131 need only be slightly wider than the photonic device 108 due to the polishing angle of the ferrule F (and associated fiber).

Figure 5A:
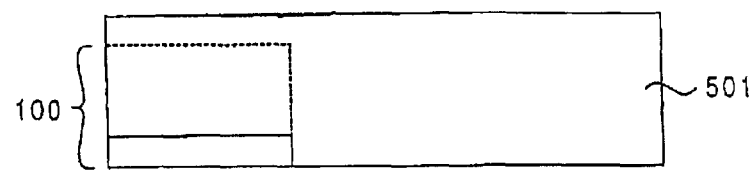
FIGS. 5(a)–5(e) are various views of a connector sleeve embodiment constructed in accordance with the principles of the present invention.

One embodiment of the invention includes a two component connector apparatus that facilitates the optical interconnection between an EOM and optical fibers. FIG. 5(a) depicts a side view of a first component, referred to herein as a connector sleeve 501. The connector sleeve 501 supports an EOM which is fitted onto the sleeve 501.

Figure 5B:
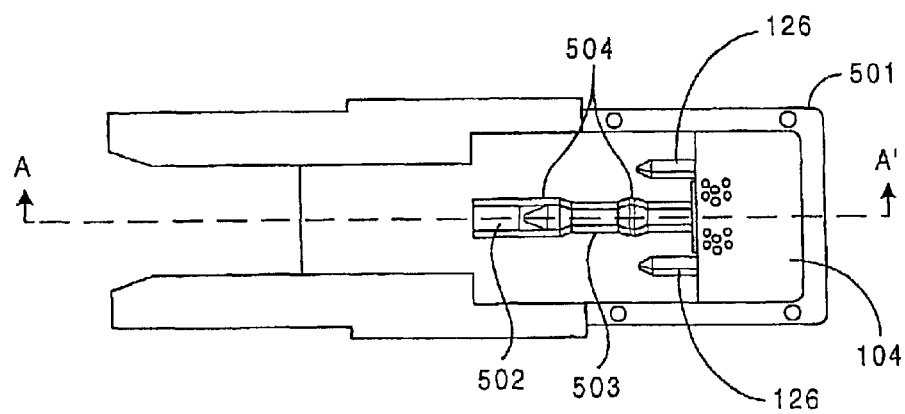

FIG. 5(b) depicts a bottom view of the connector sleeve 501. This view shows the EOM depicted with the chip sub-assembly removed so that the OSA 104 is shown. The OSA 104 includes the depicted alignment pins 126 and a plurality of photonic devices (not shown here). The depicted connector sleeve 501 is suitable for receiving and aligning a ferrule that holds optical fibers with the photonic devices of the OSA 104. The line A—A' defines a longitudinal axis of the sleeve 501. The sleeve 501 includes a first alignment feature 502 and a second alignment feature 503. In the depicted embodiment shown, these features are depicted as ridge 502 and a longitudinally extending alignment projection 503. In the depicted embodiment, the ridge 502 operates as a first stop for a connector body into which the aforementioned ferrule is slidably positioned. In other embodiments, different features can operate as a first alignment feature as a stop for the connector body. For example, other types of projections or wall mounted ridges. The second alignment feature (here, alignment projection) 503 operates to facilitate the lateral alignment of the fiber optic ferrule with respect to the photonic devices of the OSA 104. The alignment projection 503 of the depicted embodiment also includes a pair of bulges 504. The bulges 504 are configured to engage recesses or other features (such as bulges) formed in the fiber optic ferrule to securely engage the ferrule with the sleeve. Although not required to practice the invention, in the depicted embodiment, the ridge and the longitudinally extending alignment projection are arranged along a line parallel to the longitudinal axis A—A'. Also, other embodiments may incorporate a different type of second alignment feature to facilitate lateral alignment of the ferrule. By way of example, a groove or space between the sleeve walls. Additionally, these grooves or spaces may be configured to engage the ferrule. For example, by using bulges to engage the ferrule.

Figure 5C:
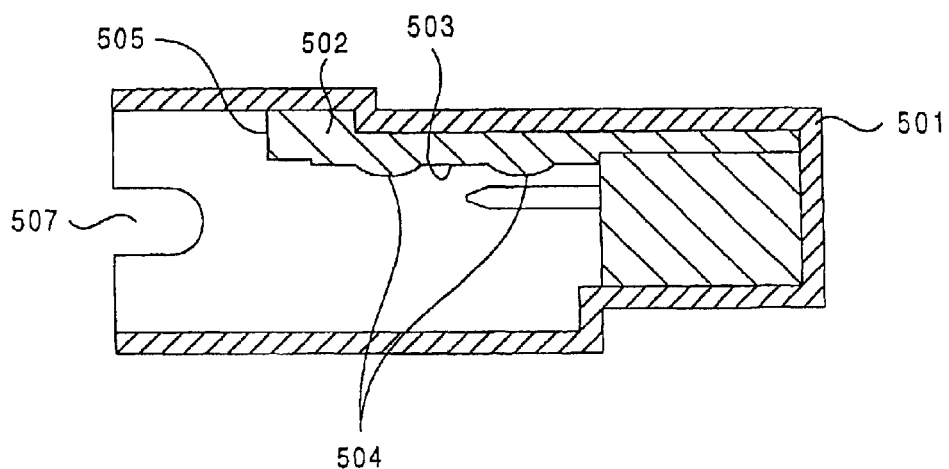
Figure 5D:
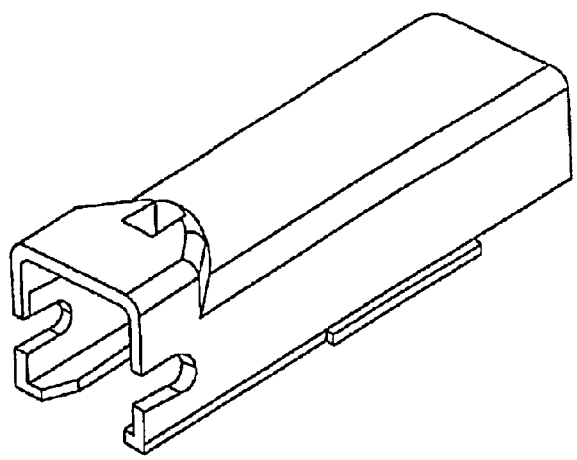
Figure 5E:
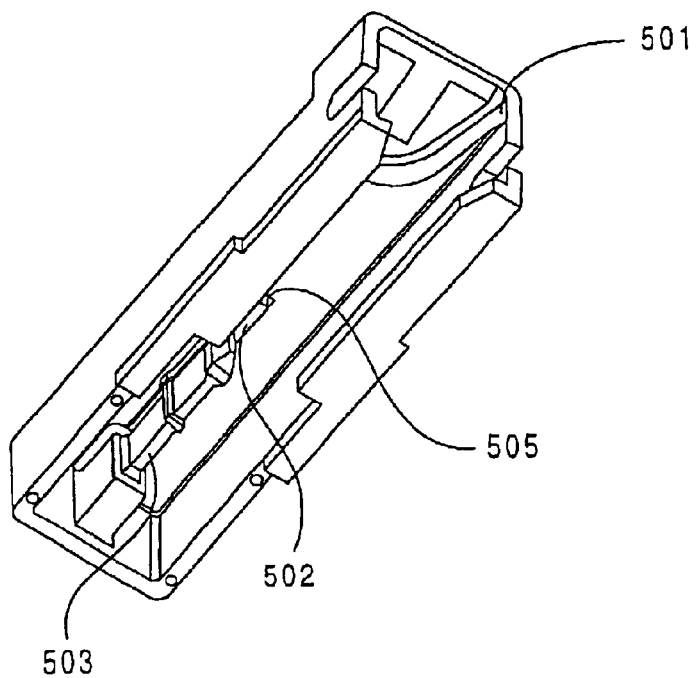

FIG. 5(c) depicts a cross-section view of the connector sleeve 501 taken along the longitudinal axis A—A' of FIG. 5(b). The OSA 104 and fine alignment pin 126 are depicted. The ridge 502 and the longitudinally extending alignment projection 503 are also shown. In the depicted embodiment, the front edge 505 of the ridge 502 operates as a first stop for a connector body into which a ferrule holding optical fibers is slidably positioned. The bulges 504 of the alignment projection 503 are also depicted. The depicted connector sleeve embodiment also includes a pair of vertical positioning grooves 507 on the side walls of the sleeve 501. The grooves 507 are intended to engage with a pair of pips on the connector body to prevent excessive vertical forces from being transferred from the connector to the sleeve 501 and EOM. FIG. 5(d) offers a "top side" perspective view of one embodiment of a connector sleeve 501. Additionally, FIG. 5(e) is a "bottom side" perspective view of one embodiment of a connector sleeve 501 with the OSA removed to show the longitudinally extending alignment projection 503 and the front edge 505 of the ridge 502.

For more detail regarding certain sleeve embodiments, reference can be made to U.S. patent application Ser. No. 09/922,358, entitled "Miniature Semiconductor Package For Opto-Electronic Devices" or U.S. patent application Ser. No. 09/922,601, entitled "Optical Sub-Assembly for Opto-Electronic Modules", each of which having been incorporated by reference.

The other major component of the two component connector apparatus is a connector element that fits together with the previously discussed connector sleeve to optically interconnect the optical fibers with the photonic elements. The connector element includes a connector body and a ferrule that is slidably positioned in the connector body.

Figure 6A:
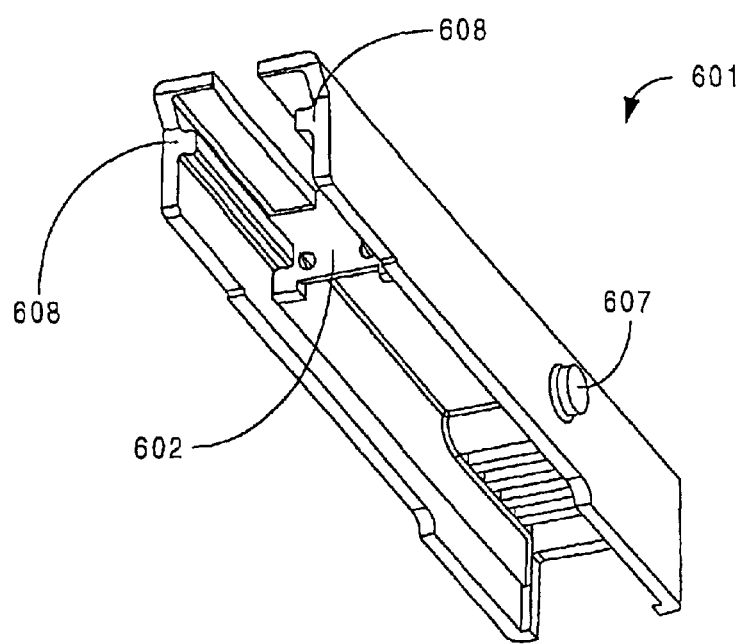
FIGS. 6(a) and 6(b) are various views of a connector body embodiment constructed in accordance with the principles of the present invention.

FIG. 6(a) is a perspective view of an embodiment of a connector body 601 as viewed from underneath. The bottom portion of the connector body 601 is removed in this view so that the inside of connector body 601 can be viewed. The depicted embodiment includes a forward stop 602. The forward stop 602 contacts the front edge 505 of the ridge 502 of the connector sleeve 501 as the sleeve 501 is engaged with the connector element. Thus, the forward stop 602 and the ridge 502 operate to prevent the ferrule (described in greater detail below) from being damaged by excessive insertion force as the connector body is engaged with the connector sleeve. As previously discussed, other features can facilitate the forward stop of the ferrule. The depicted embodiment also shows a pair of side rails 608 that engage corresponding side grooves in the ferrule to facilitate the ferrule sliding back and forth inside the connector body 601. On the outside portion of the connector body is a pair of pips 607 which are designed (as explained above) to engage the grooves 507 on the side walls of the sleeve 501 to prevent the transfer of excessive vertical forces to the sleeve and EOM. The engagement of the vertical positioning grooves 507 with the pips 607 can be used to provide coarse vertical positioning for the connector body 601 when engaged with the connector sleeve 501.

Figure 6B:
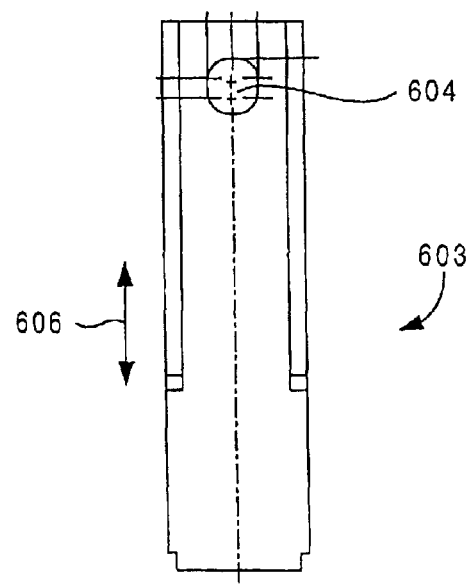

FIG. 6(b) is a depiction of the bottom portion 603 of the connector body 601. The bottom portion 603 of the connector body includes a slot 604. The slot 604 is designed to permit the sliding motion (back and forth in a longitudinal direction defined by the arrows 606) of a fiber optic ferrule fitted inside the connector body 601.

Figure 7A:
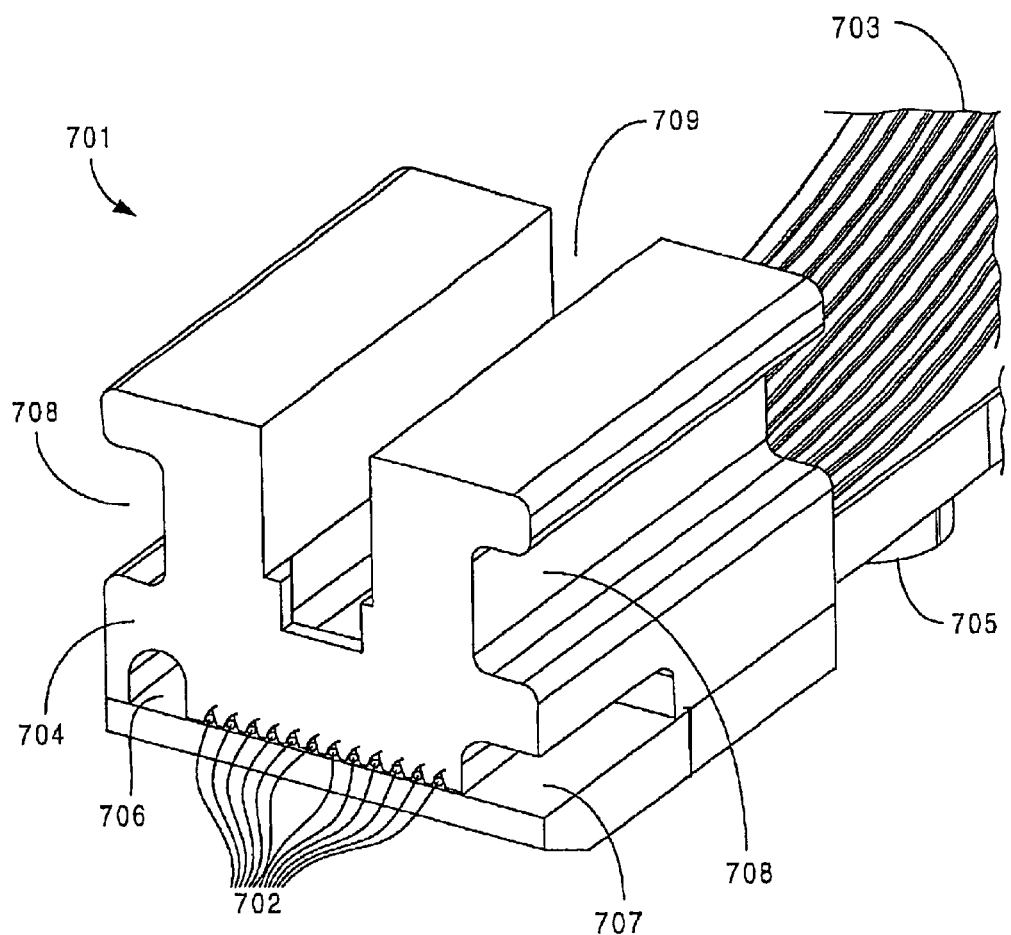
FIGS. 7(a)–7(d) are various views of a connector ferrule embodiment constructed in accordance with the principles of the present invention.
Figure 7B:
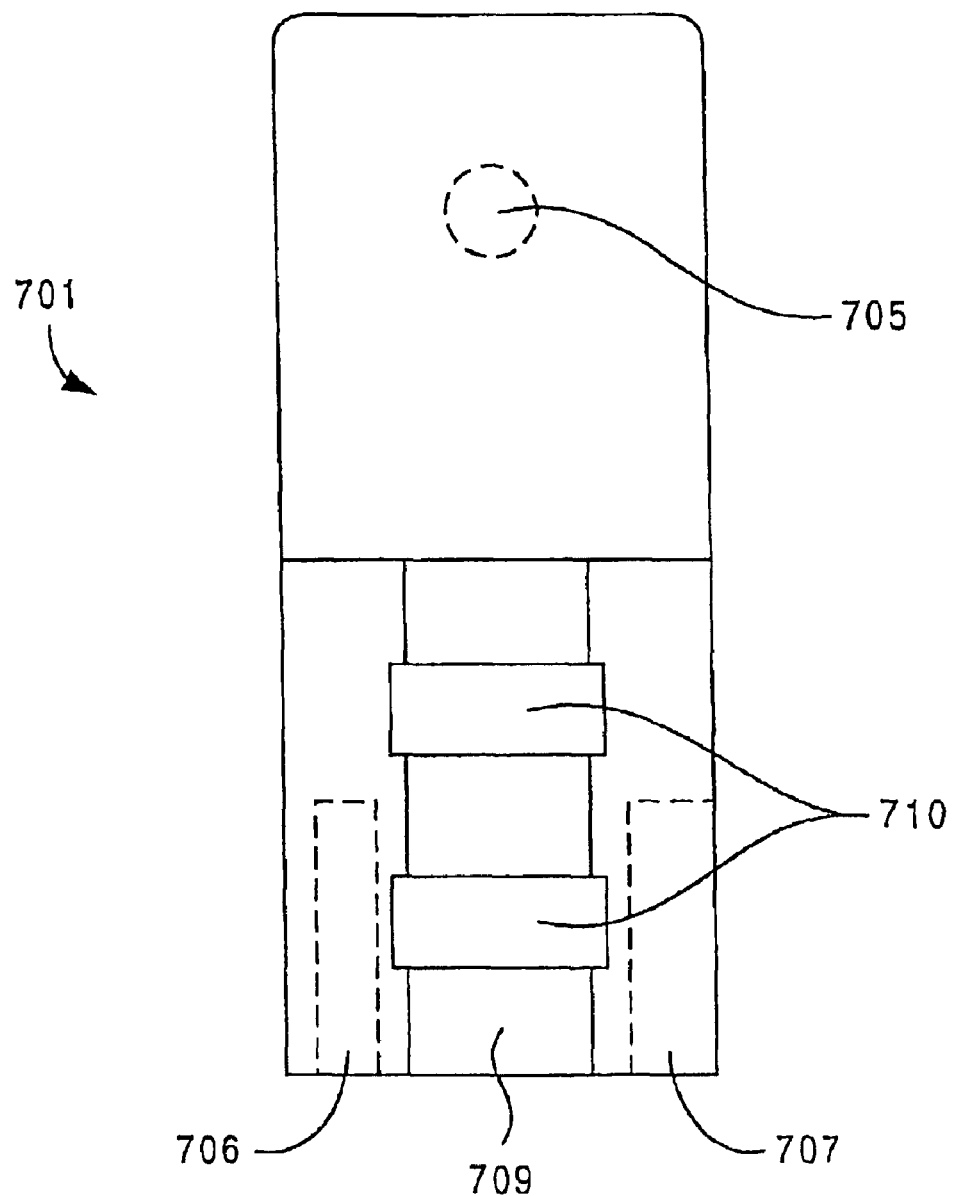
Figure 7C:
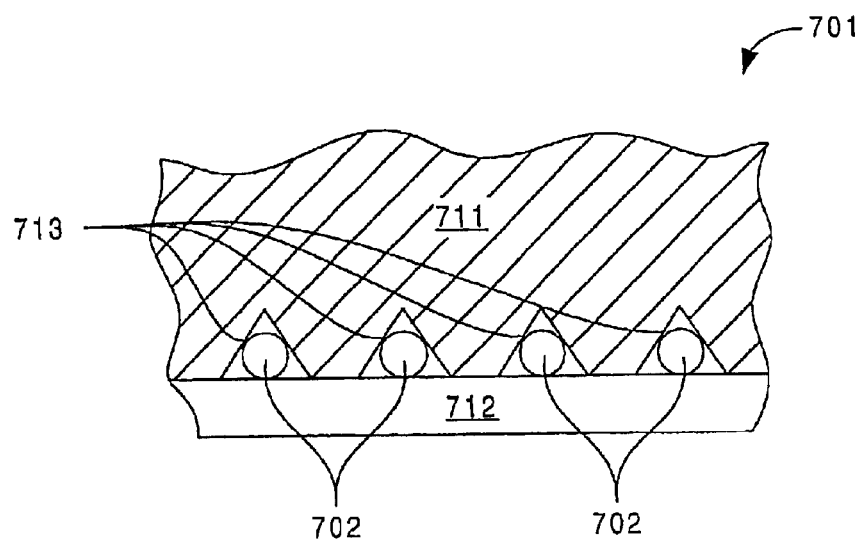
Figure 7D:
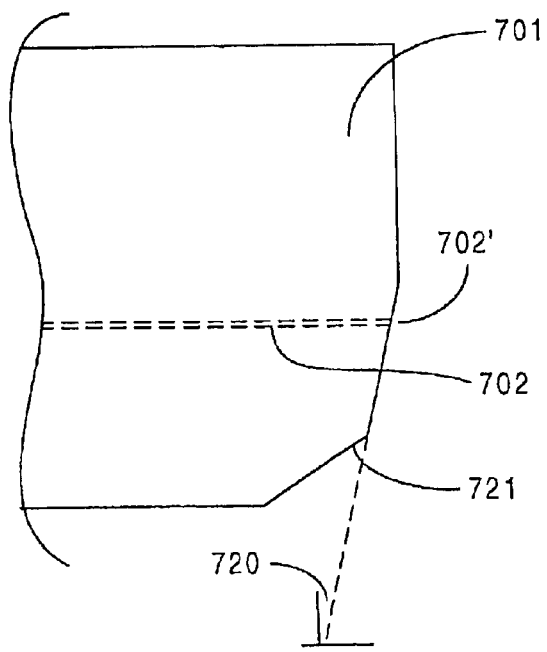

FIG. 7(a) is a perspective view of a portion of one fiber optic ferrule embodiment 701 that can be slidably positioned inside the connector body 601 of FIG. 6(a). In the depicted embodiment, the ferrule 701 is configured to hold a plurality of optical fibers 702. Typically, such fibers 702 form part of a fiber optic ribbon 703. The underside of the ferrule 701 includes a tab 705. As briefly alluded to above, the tab 705 engages the slot 604 of the bottom of the connector body. This holds the ferrule in position laterally while permitting the ferrule 701 to slide back and forth in the connector body 601 as needed. This embodiment of the ferrule 701 includes a pair of side grooves 708 configured to fit to a corresponding pair of side rails 608 inside the connector body 601. The side rails 608 and grooves 708 facilitate the ferrule 701 sliding back and forth inside the connector body 601. Additionally, the depicted embodiment includes facing surface 704 having a pair of openings configured to receive the fine alignment pins 126 of the OSA 104. In the depicted configuration, the openings comprise a hole 706 and a slot 707. Other configurations for such openings can be used including, but not limited to, configurations having more than one hole or slot and configurations where only slots or only holes are used. Also, the ferrule 701 includes a longitudinally extending alignment groove 709 configured to provide coarse lateral alignment of the ferrule 701 with the OSA 104 in the sleeve 501. Thus, each optical fiber 702 is coarsely aligned with respect to a corresponding photonic device 108 of the OSA 104 when the connector element is connected to the connector sleeve 501.

One consideration in forming the alignment openings in the ferrule 701 is the high tolerances required for such openings. To maintain such tolerances, the optical fiber connector components must be manufactured with precision. Specifically, the size and location of the alignment openings must be carefully formed. In the depicted embodiment, alignment opening 706 is an enclosed hole within which an alignment pin is secured. However, alignment opening 707 is configured as an open-sided slot. Kinematic constraint is established with such a design since the open side allows for minor misalignment due to thermal mismatch or manufacturing tolerances of the various components. A design that calls for pin insertion into two circular holes requires higher tolerances. In alternative embodiments, the alignment pins can instead be mounted on the ferrule, with the alignment openings being formed on the OSA 104.

FIG. 7(*b*) is a top-down view of an embodiment of a fiber optic ferrule 701. The fiber optic ribbon is not shown in this view. The longitudinally extending alignment groove 709 is depicted. In this embodiment, the longitudinally extending alignment groove 709 includes a pair of recesses 710. The recesses are configured to engage the bulges 504 of the longitudinally extending alignment projection 503 of the connector sleeve 501. In an alternative embodiment, these engagement features can be bulges rather than recesses 504. Also shown is the tab 705 located on the underside of the ferrule 701. Also shown are the alignment openings 706 (the hole) and 707 (the slot). In other embodiments, the groove 709 may be replaced by other longitudinal alignment features. For example, a longitudinal ridge can be used. In another alternative, longitudinal alignment can be facilitated using the external faces of the ferrule or grooves in the sides of the ferrule. In each case, these features are configured to engage longitudinal alignment features on the sleeve. Bulges can also be implemented to engage the ferrule to the sleeve in these alternative embodiments.

FIG. 7(*c*) is a front view of a portion of a fiber optic ferrule embodiment 701. The optical fibers 702 of the fiber optic ribbon are shown. A top portion 711 of the depicted ferrule 701 includes a series of "V-grooves" 713 in its bottom surface. The optical fibers 702 are fitted into the V-grooves 713. A bottom portion 712 of the ferrule 701 is affixed to the top portion 711, clamping the fibers 702 in place in the V-grooves 713. The three components 711, 712, 702 can be fixed together using a wide variety of techniques known to those having ordinary skill in the art. In one example, the components can be held together using an epoxy. Many alternative embodiments for accurately positioning fibers in a ferrule can also be used to mount the fibers in the ferrule.

FIG. 7(*d*) is a side view of the front portion of a fiber optic ferrule embodiment 701. The optical fibers 702 (one of which is shown here using the dotted line) of the fiber optic ribbon are shown. In one embodiment, the front face 702' of the fibers 702 and ferrule 701 are polished to an optically desirable angle 720. In one embodiment, this angle 720 is about 8°. Also, in some embodiments, the lower portion 721 of the front of the ferrule 701 is constructed having an angle that will facilitate engagement of the ferrule 701 with a connector sleeve 501.

Figure 8A:
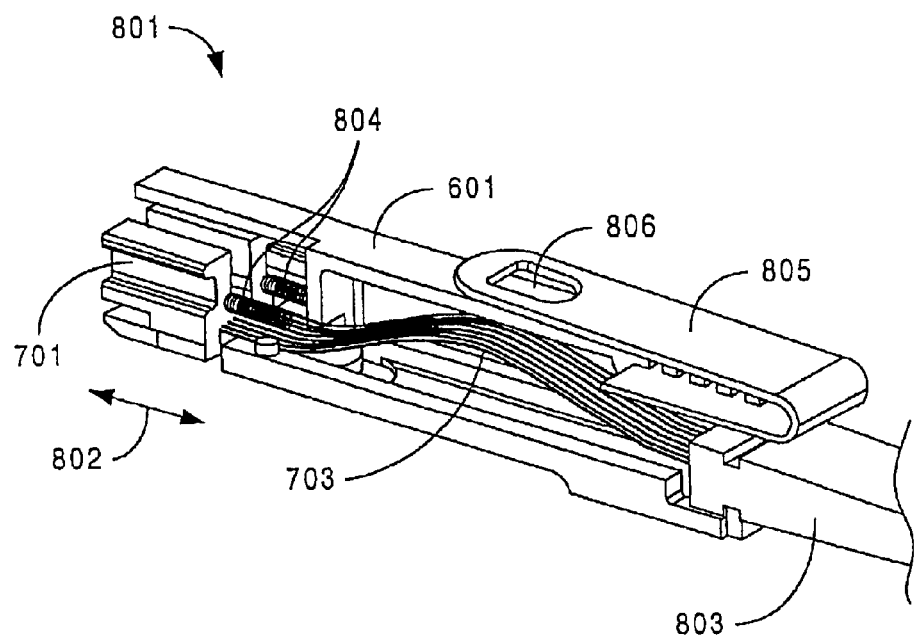
FIGS. 8(a) and 8(b) are various views of an embodiment of an assembled connector element including a connector ferrule slidably positioned in a connector body, all constructed in accordance with the principles of the present invention.
Figure 8B:
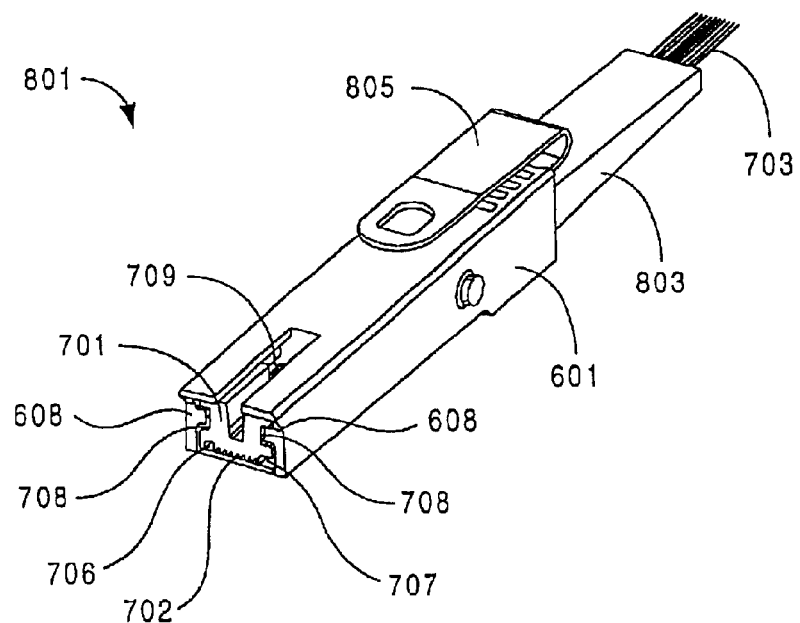

FIG. 8(*a*) is a perspective cut-away view of a connector element embodiment 801 suitable for positioning an optical fiber relative to a photonic device. The depicted embodiment shows a connector body 601, into which the fiber optic ferrule 701 is slidably positioned. The fiber optic ferrule 701 is positioned in the connector body 601 such that it can slide backward and forward in a longitudinal direction (indicated by the arrows 802) relative to the connector body 601. The depicted embodiment shows a fiber optic ribbon 703 holding a plurality of optical fibers. The fiber optic ribbon 703 is held at one end by the ferrule 701 and, in this embodiment, also held in the connector body 601 using a strain relief 803. The strain relief 803 can be made of many materials, including rubber. The fiber optic ribbon 703 is typically made of a plurality of optical fibers held together with an applied coating or an aramid yarn to increase strength. In the depicted embodiment, the ferrule 701 is positioned in the connector body 601 such that a bend is formed in the fiber optic ribbon 703 between the connector body 601 and the fiber optic ferrule 701. An unbending force generated by the resilient fiber optic ribbon 703 can provide a biasing mechanism for urging the ferrule 701 toward photonic devices and into contact with the spacer (not shown here). This unbending force generated by the resilient fiber optic ribbon 703 can provide the only biasing mechanism for urging the ferrule 701 toward the photonic device and spacer. Also, as depicted here, the biasing mechanism can include another mechanism for urging the ferrule 701 toward the photonic device and spacer. In the depicted embodiment, a pair of biasing springs 804 adds to the force used to urge the ferrule 701 toward the photonic device. Alternatively, biasing springs 804 alone can be used to urge the ferrule 701 toward the photonic device into contact with the spacer. The depicted embodiment includes a "pencap spring" 805 having an opening 806. The opening 806 engages a detent of the connector sleeve to releasably interlock the connector element and connector sleeve components when fitted together and engaged.

FIG. 8(*b*) is another perspective view of a connector element embodiment 801. The depicted embodiment shows the fiber optic ferrule 701 positioned in the connector body 601. A portion of the fiber optic ribbon 703 is shown, as is a strain relief 803. The depicted embodiment shows a "pencap spring" 805. Also illustrated is the front facing surface of the ferrule 701. This view shows a plurality of optical fibers 702 and a pair of openings configured in a hole 706/slot 707 configuration. This view also shows the engagement of the ferrule side grooves 708 with the side rails 608 of the connector body 601. The depicted embodiment also shows the longitudinally extending alignment groove 709 that provides coarse lateral alignment of the ferrule 701 when engaged with the alignment projection 503 of the sleeve 501.

Figure 9:
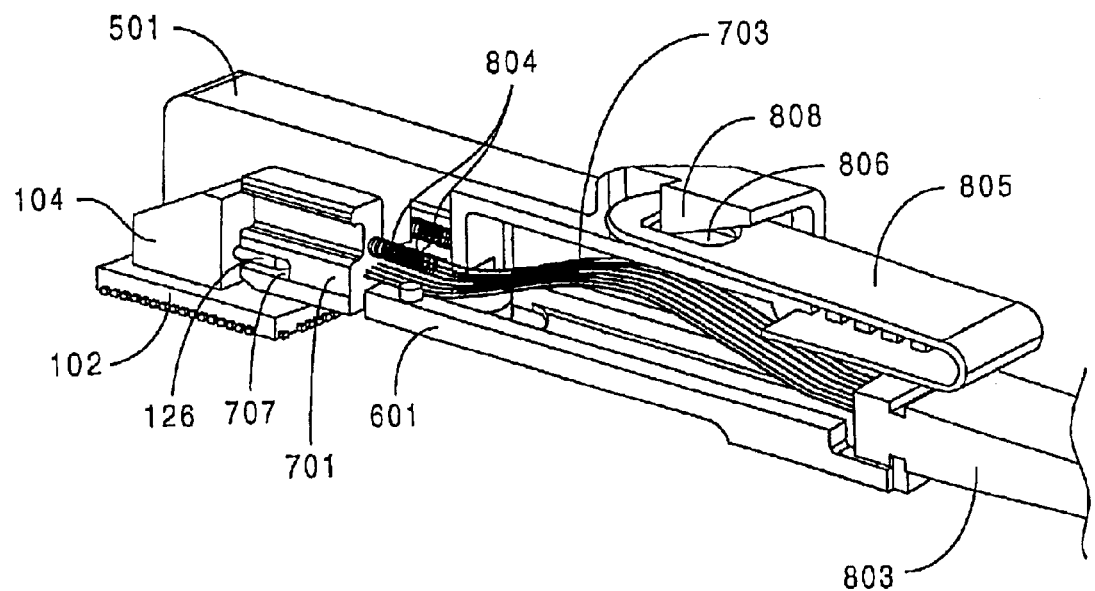
FIG. 9 is a cut-away perspective view of a connected connector apparatus showing the connector element engaged with the connector sleeve in accordance with the principles of the present invention.

FIG. 9 is a perspective cut-away view of a connector element embodiment (801 of FIG. 8(*a*)) that is engaged with a connector sleeve embodiment 501. The connector sleeve embodiment 501 includes the OSA 104 positioned relative to the connector sleeve 501. The CSA 102 is also shown in operative combination with the OSA 104. The cut-away view shows the engagement and alignment of alignment pin 126 (of the OSA 104) with an alignment slot 707 of the fiber optic ferrule 701. As previously described, the optical alignment between the optical fibers of the ferrule 701 and the photonic devices of the OSA 104 (which is not viewable in this illustration) is defined by: the engagement of the alignment pins 126 with the alignment hole (not shown in this view) and alignment slot 707; the engagement of the ferrule face with the spacer 131 defines an optical stop that positions the optical fibers 702 at desired distances from the corresponding photonic devices of the OSA 104; and the engagement of the longitudinally extending alignment projection of the sleeve and the longitudinally extending alignment groove of the ferrule (not shown in this view). The biasing mechanism shown in the depicted embodiment is a combination of a pair of biasing springs 804 and an unbending force provided by the bent fiber optic ribbon 703. Both urge the ferrule into contact with the spacer 131 to position the optical fibers a desired distance away from the photonic devices. Also shown is the strain relief 803. FIG. 9 also depicts the engagement of the "pencap spring" 805 with the detent 808. As mentioned previously, the opening 806 in the spring 805 engages the detent 808 to secure the connector element to the connector sleeve. Pressing down on the spring 805 allows the easy detachment of the spring 805 from the detent 808 when disconnection is desired.

Figure 10:
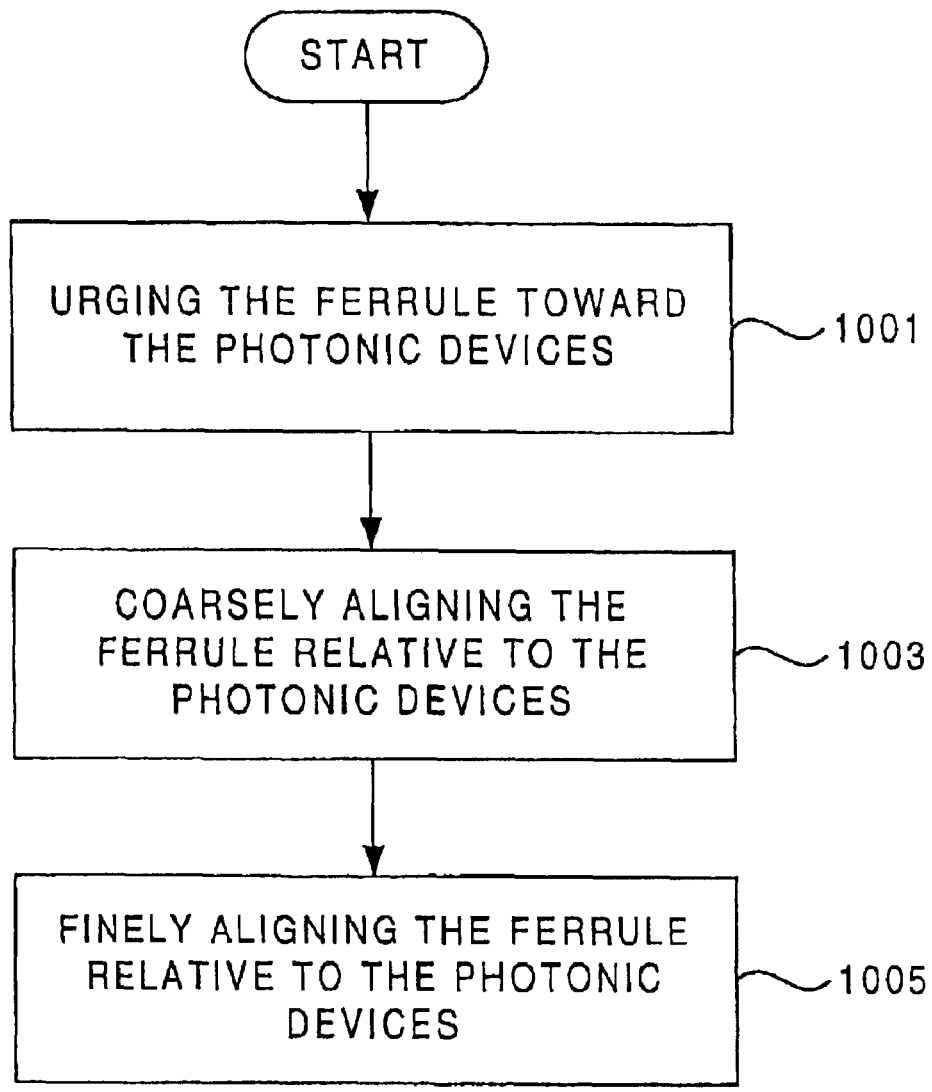
FIG. 10 is a flow diagram illustrating a method of positioning an optical fiber relative to a corresponding photonic device in accordance with the principles of the present invention.

FIG. 10 is a flow diagram that illustrates a method of positioning an optical fiber held by a ferrule that is slidably mounted within a connector body, relative to a corresponding photonic device of an optical sub-assembly carried by a connector sleeve. One method embodiment comprises urging the fiber optic ferrule toward the corresponding photonic device of the connector sleeve (Step 1001); coarsely aligning the optical fiber of the ferrule with the corresponding photonic device of the connector sleeve as the fiber optic ferrule is urged toward the connector sleeve (Step 1003); and, finely aligning the optical fiber of the fiber optic ferrule with the corresponding photonic device as the ferrule is urged toward the corresponding photonic device until the optical fiber is correctly positioned with respect to the corresponding photonic device (Step 1005).

In one embodiment, the optical fibers can be coarsely aligned with corresponding photonic devices by engaging an alignment projection of the connector sleeve with an alignment groove on the ferrule to laterally position the optical fibers with respect to corresponding photonic devices as the ferrule is urged toward the corresponding photonic device of the connector sleeve. In another embodiment, optical fibers can be coarsely aligned with corresponding photonic devices by urging the connector body into contact with an alignment stop that prevents the connector body from contacting the corresponding photonic device as the ferrule is urged toward the corresponding photonic device of the connector sleeve.

Some method embodiments of the invention finely align the optical fibers with corresponding photonic devices as the ferrule is urged toward the photonic devices by engaging fine alignment pins of the optical sub-assembly with alignment openings that can include a hole and a slot, both located in the face of the fiber optic ferrule, so that when the alignment pins are engaged with the alignment openings, the optical fibers are properly aligned with respect to corresponding photonic devices. Other embodiments locate the pins on the ferrule and the corresponding fine alignment openings on the fiber optic ferrule. Still other embodiments for finely aligning the optical fiber with corresponding photonic devices include urging the ferrule toward the corresponding photonic devices until the ferrule contacts a spacer such that the optical fibers are spaced apart from the corresponding photonic devices at a desired optical distance. Such embodiments can be used together or independently.

The present invention has been particularly shown and described with respect to certain preferred embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. Other embodiments and variations to the depicted embodiments will be apparent to those skilled in the art and may be made without departing from the spirit and scope of the invention as defined in the following claims. Further, reference in the claims to an element in the singular is not intended to mean "one and only one" unless explicitly stated, but rather, "one or more".

What is claimed is:

1. An apparatus for positioning at least one optical fiber relative to a photonic device, the apparatus comprising:
   a connector sleeve suitable for receiving a fiber optic ferrule that holds at least one optical fiber, the connector sleeve being arranged to carry an optical sub-assembly including at least one photonic device, the connector sleeve having a longitudinal axis, and including
   a longitudinally extending alignment projection that laterally aligns the fiber optic ferrule with respect to the at least one photonic device of the optical sub-assembly; and
   wherein the longitudinally extending alignment projection operates as a first stop for a connector body into which the fiber optic ferrule is slidably positioned.

2. The apparatus of claim 1, wherein the ridge that operates as a first stop for the connector body comprises a longitudinally extending ridge.

3. The apparatus of claim 1, wherein the longitudinally extending ridge and the longitudinally extending alignment projection are arranged along a line parallel to the longitudinal axis.

4. The apparatus of claim 1, wherein the longitudinally extending alignment projection includes a bump configured to engage a recess formed in the fiber optic ferrule.

5. The apparatus of claim 1, wherein the optical sub-assembly includes a pair of fine alignment pins suitable for engaging an alignment opening and an alignment slot both located in the face of the fiber optic ferrule so that when the alignment pins are engaged with the alignment opening and the alignment slot of the fiber optic ferrule, each optical fiber is properly aligned with respect to a corresponding photonic device.

6. A connector apparatus for positioning at least one optical fiber relative to at least one photonic device, the apparatus comprising:
   a connector element having a longitudinal axis comprising
      a connector body; and
      a fiber optic ferrule that holds at least one optical fiber, the ferrule slidably positioned inside the connector body;
   a connector sleeve configured to receive the connector element and arranged to carry an optical sub-assembly including at least one photonic device and a spacer, the connector sleeve having a longitudinal axis, and including
      a ridge that operates as a first stop for the connector body; and
      a longitudinally extending alignment projection that coarsely aligns the fiber optic ferrule laterally with respect to the photonic device of the optical sub-assembly; and
   the connector element is engaged with the connector sleeve to position the ferrule with respect to the optical sub-assembly such that the optical fiber is correctly positioned relative to a corresponding photonic device.

7. The connector apparatus of claim 6, wherein when the connector element is engaged with the connector sleeve the front face of the ferrule contacts the spacer, thereby defining a correct optical standoff distance between the optical fiber and a corresponding photonic device.

8. The connector apparatus of claim 6, wherein the ridge of the connector sleeve comprises a longitudinally extending ridge.

9. The connector apparatus of claim 8, wherein the longitudinally extending ridge and the longitudinally extending alignment projection are arranged along a line parallel to the longitudinal axis.

10. The connector apparatus of claim 9, wherein the ferrule includes a longitudinally extending alignment groove positioned such that when the connector element is connected to the connector sleeve, the longitudinally extending alignment projection engages the alignment groove to coarsely position the ferrule with respect to the optical sub-assembly so that the optical fiber is coarsely positioned relative to the corresponding photonic device.

11. The connector apparatus of claim 10, wherein the optical sub-assembly of the connector sleeve includes a first fine adjustment pin and a second fine adjustment pin; and the fiber optic ferrule of the connector element includes an alignment opening and an alignment slot both located in the face of the fiber optic ferrule and configured to respectively receive the first and second alignment pins so that when the alignment pins are engaged with the alignment opening and the alignment slot of the fiber optic ferrule, and when the front face of the ferrule contacts the spacer, the optical fiber is aligned with respect to a corresponding photonic device.

12. The connector apparatus of claim 11 wherein the spacer of the optical sub-assembly comprises a lens array fitted on the photonic elements of the optical sub-assembly.

13. The connector apparatus of claim 10, wherein the longitudinally extending alignment groove of the ferrule further includes an inside surface having a recess and wherein the longitudinally extending alignment projection of the connector sleeve includes a bulge configured to engage the recess when the connector element is engaged with the connector sleeve.

14. The connector apparatus of claim 8, wherein the optical sub-assembly of the connector sleeve includes a first fine adjustment pin and a second fine adjustment pin; and the fiber optic ferrule of the connector element includes an alignment opening and an alignment slot both located in the face of the fiber optic ferrule and configured to respectively receive the first and second alignment pins so that when the alignment pins are engaged with the alignment opening and the alignment slot of the fiber optic ferrule, the optical fiber is aligned with respect to a corresponding photonic device.

15. The connector apparatus of claim 6, wherein the optical sub-assembly includes a spacer and wherein the connector element includes a biasing mechanism for urging the slidably positioned fiber optic ferrule toward the photonic device of the connector sleeve until the front face of the ferrule contacts the spacer.

16. A connector apparatus as in claim 15, wherein the biasing mechanism urges the slidably positioned fiber optic ferrule toward the corresponding photonic device until the ferrule comes in contact with the spacer stopping the ferrule in a position so that each optical fiber is positioned at a desired optical standoff distance from the corresponding photonic device.

17. The connector apparatus of claim 15, wherein the biasing mechanism includes a spring for urging the slidably positioned fiber optic ferrule toward the photonic device.

18. The connector apparatus of claim 15, wherein the at least one optical fiber is arranged in a resilient fiber optic ribbon connected with the connector body and with one end held in the fiber optic ferrule such that a bend is formed in the fiber optic ribbon between the connector body and the fiber optic ferrule and wherein the biasing mechanism for urging the ferrule toward the photonic device is generated by an unbending force created by the bend of the fiber optic ribbon.

19. The connector apparatus of claim 18, wherein the biasing mechanism further includes a spring for urging the slidably positioned fiber optic ferrule toward the photonic device.

* * * * *

UNITED STATES PATENT AND TRADEMARK OFFICE
CERTIFICATE OF CORRECTION

PATENT NO. : 6,830,382 B1
DATED : December 14, 2004
INVENTOR(S) : Deane et al.

It is certified that error appears in the above-identified patent and that said Letters Patent is hereby corrected as shown below:

Title page,
Item [54], Title, change "CONNECTER" to -- CONNECTOR --.

Column 1,
Line 54, change "modem computer" to -- modern computer --.

Signed and Sealed this

Twenty-fourth Day of May, 2005

JON W. DUDAS
*Director of the United States Patent and Trademark Office*